US005111319A

United States Patent [19]

Morris

[11] Patent Number: 5,111,319

[45] Date of Patent: May 5, 1992

[54] DRIVE CIRCUIT FOR PROVIDING AT LEAST ONE OF THE OUTPUT WAVEFORMS HAVING AT LEAST FOUR DIFFERENT VOLTAGE LEVELS

[75] Inventor: Christopher J. Morris, Middlesex, England

[73] Assignee: Thorn EMI plc, London, England

[21] Appl. No.: 653,759

[22] Filed: Feb. 11, 1991

Related U.S. Application Data

[63] Continuation of Ser. No. 220,476, Jul. 18, 1988, abandoned.

[30] Foreign Application Priority Data

Jul. 21, 1987 [GB] United Kingdom ................ 8717172
Aug. 3, 1987 [GB] United Kingdom ................ 8718351

[51] Int. Cl.[5] ........................ G02F 1/13; G09G 3/00

[52] U.S. Cl. ........................ 359/85; 340/811; 340/805

[58] Field of Search .................... 350/332, 333, 350 S; 340/784, 805, 811; 307/264, 268, 571; 359/85

[56] References Cited

U.S. PATENT DOCUMENTS

| | | | |
|---|---|---|---|
| 3,911,421 | 10/1975 | Alt et al. | 350/333 |
| 4,050,064 | 9/1977 | Hashimoto et al. | 350/332 |
| 4,099,073 | 7/1978 | Hashimoto et al. | 350/332 X |
| 4,227,193 | 9/1980 | Shanks | 340/784 |
| 4,231,035 | 10/1980 | Van Doorn et al. | 340/784 |
| 4,278,974 | 7/1981 | Kondo | 350/333 X |
| 4,529,890 | 7/1985 | Kobayashi et al. | 307/571 X |
| 4,556,880 | 12/1985 | Hamada | 340/784 |
| 4,656,470 | 4/1987 | Saka | 340/805 |
| 4,705,345 | 11/1987 | Ayliffe et al. | 350/333 |
| 4,728,947 | 3/1988 | Ayliffe et al. | 340/805 |
| 4,765,720 | 8/1988 | Toyono et al. | 350/333 |
| 4,770,502 | 9/1988 | Kitazima et al. | 350/333 X |
| 4,800,382 | 1/1989 | Okada et al. | 340/784 |
| 4,906,984 | 3/1990 | Takeda et al. | 340/784 X |

FOREIGN PATENT DOCUMENTS

| | | | |
|---|---|---|---|
| 0031582 | 7/1981 | European Pat. Off. | 307/264 |
| 2194663 | 9/1988 | United Kingdom . | |

*Primary Examiner*—Stanley D. Miller
*Assistant Examiner*—Huy K. Mai
*Attorney, Agent, or Firm*—Fleit, Jacobson, Cohn, Price, Holman & Stern

[57] ABSTRACT

A drive circuit comprises a first waveform generator and a second waveform generator. Each waveform generator is capable of generating at least two voltage states and the instantaneous voltage of the first waveform is never less than that of the second waveform by more than a defined amount. The circuit further comprises a plurality of means to produce respectively a plurality of output waveforms by selectively switching to either the first waveform or the second waveform and a gate array to control the selective switching. The arrangement is such that each of the plurality of means to produce respectively a plurality of output waveforms is capable of producing an output waveform having at least four voltage states. The drive circuit produces a plurality of outputs suitable for driving a matrix-addressed display.

10 Claims, 13 Drawing Sheets

DRIVE CIRCUIT FOR PROVIDING AT LEAST ONE OF THE OUTPUT WAVEFORMS HAVING AT LEAST FOUR DIFFERENT VOLTAGE LEVELS

This application is a continuation of application Ser. No. 07/220,476, filed Jul. 18, 1988 now abandoned.

The invention relates to a drive circuit for producing a plurality of outputs, in particular, though not exclusively, to such a drive circuit for driving a matrix addressed display.

The present invention concerns the use of readily-available integrated circuits for efficiently implementing complicated X-Y matrix display device drive schemes for two level displays. One application of the present invention is to techniques involving pulse-width multiplex switching of matrix-array type liquid crystal display devices, whether alone or in combination with pulse-height switching, as disclosed in copending U.S. patent application Ser. No. 220316 (Morris et al) also claiming priority from GB 8717172 and GB 8718351. Another application of the present invention is to methods of addressing a matrix array type liquid crystal display device in which pixels not being switched are stabilised in a required state by the application of a high frequency A.C. waveform.

Display driver chips are available which have multiple high voltage CMOS outputs and take the form of n stage shift registers with latched outputs. These chips were originally designed for use with ACEL displays but they are now being used in a number of LCD implementations. An apparent limitation of these devices is that the outputs are two state. The output voltage is either at the high voltage or at ground. This limitation is removed by using the proposed arrangement and method.

A liquid crystal material consists of long thin polar molecules and so can preserve a high degree of long range orientational ordering of the molecules in a liquid condition. Such materials are anisotropic with properties, such as dieletric constant, characterized by two constants, one in the direction of the long molecular axis and one perpendicular to it. The anisotropic nature of the dielectric constant enables the molecules to be aligned in an electric field, the molecules tending to be orientated in the direction giving the minimum electrostatic free energy.

Some liquid crystal materials also exhibit ferroelectric properties i.e. they have a permanent dipole moment which is perpendicular to the long molecular axis. When the liquid crystal material is placed between two glass plates whose surfaces have been treated to align the molecules, then the molecules will have two possible states depending on the direction of the permanent dipole moment. These states are bistable. By applying an electric field of the correct amplitude and polarity, it is possible to switch the molecules between the two states.

Once the molecules have been switched into one of the two states, they can advantageously be stabilised in that state by the application of a high frequency A.C. waveform.

In a matrix-type display device comprising a ferroelectric liquid crystal layer, the pixels of the matrix are defined by areas of overlap between members of a first set of electrodes on one side of the liquid crystal layer and members of a second set of electrodes on the other side of the liquid crystal layer. An electric field is applied across the molecules of a pixel by the generation of voltage at the member of the first set of electrodes and the member of the second set of electrodes that define the pixel.

The individual electrodes can be either in electrical contact with or insulated from the liquid crystal layer. In the former case, there is a risk of electrolytic degradation of the liquid crystal if there is a nett flow of direct current through the layer. In the latter case, there is the risk of a cumulative build-up of charge at the interface between the liquid crystal and the insulation. Both these risks can be reduced by ensuring that the voltage waveforms applied to the individual electrodes over time are charge-balanced, i.e. have a zero d.c. content, at least in the long term.

As outlined above, an electric field has two effects on ferroelectric liquid crystal molecules. One is to stabilise them into the nearest preferred state by acting on the dielectric anisotropy. The applied couple due to this effect is proportional to the square of the voltage. The other effect of the field is to act on the permanent dipole. The couple applied due to this effect is proportional to the voltage. The nett effect is a parabolic voltage to 'switching force' characteristic. Thus a long low voltage pulse can have much greater effect than a short high voltage pulse of the same area.

Copending U.S. patent application Ser. No. 220316 (Morris et al) priority from GB 8717172 and GB 8718351 discloses and claims a method of addressing a matrix-array type liquid crystal cell with a ferroelectric liquid crystal layer having a plurality of pixels defined by areas of overlap between members of a first set of electrodes on one side of the liquid crystal layer and members of a second set of electrodes on the other side of the liquid crystal layer, each of said pixels having a first and a second optically distinguishable state, and having a response time for switching between said first and said second states which depends on the potential difference across the liquid crystal layer, the method including the step of applying a switching pixel waveform to a selected pixel to switch said selected pixel between said first and second states wherein said switching pixel waveform is charge-balanced and comprises a first pulse having a sufficient pulse width and pulse height magnitude to switch said selected pixel and a second pulse contributing to charge-balancing, said second pulse having a pulse height magnitude greater than the sufficient pulse height magnitude of said first pulse and a pulse width which is insufficient to switch said selected pixel.

In order to produce such a switching pixel waveform, relatively complex voltage waveforms may need to be generated at the members of the first and second sets of electrodes. As each set of electrodes may have the order of several hundred electrodes, the electrical circuitry for implementing the method outlined hereinbefore is potentially very complicated.

A similar problem arises when it is required to provide a high frequency A.C. waveform across pixels that are not being switched.

According to the present invention, there is provided a drive circuit for producing a plurality of outputs suitable for driving a matrix-addressed display, the circuit comprising a first and a second means to generate respectively a first and a second waveform, each of said first and said second means being capable of generating at least two voltage states, the instantaneous voltage of said first waveform being never less than that of said second waveform by more than a defined amount, the circuit further comprising a plurality of means to produce a respective output waveform by selectively switching to either said first waveform or said second waveform and means to control said selective switching, the arrangement being such that each of said plurality of means to produce a respective output waveform is capable of producing a respective output waveform having at least four voltage states.

In such a drive circuit, relatively complex output waveforms can be produced at a plurality of outputs but generating waveforms at only said first and said second means for the whole drive circuit. The invention utilises the fact that though the output waveform may be complex, involving four voltage states or more, and may be different at each output, at any one instant, an output should be in one of only two voltage states, depending on whether the output is to be 'on' or 'off'.

With regard to the terminology of the present specification, it is to be noted that the term 'slot' can have one of two meanings i.e. 1) the minimum time that a liquid crystal material takes to switch from a first state to a second state for a given pulse height; 2) the time for which a waveform is at a (given) constant voltage, i.e. the pulse width of a pulse of a given pulse height.

As meaning (2) is more common in the art, this will be the meaning intended in the present specification unless otherwise indicated. Also unless otherwise indicated the term used in the present specification for meaning (1) will be 'response time, $t_s$'.

Embodiments of the invention will now be described, by way of example only, and with reference to the accompanying drawings in which.

Figure 1:
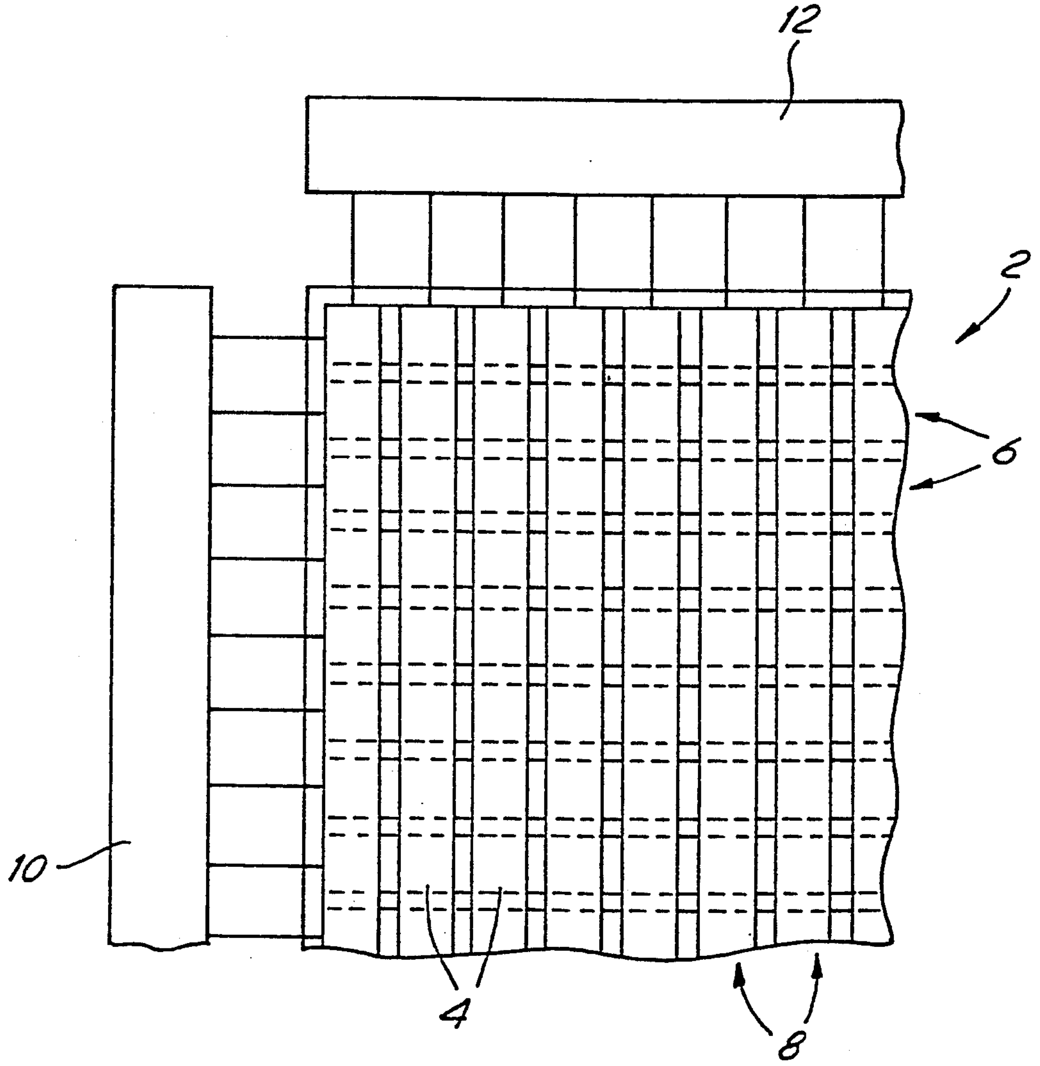
FIG. 1 shows, schematically, a liquid crystal display device incorporating drive circuits provided in accordance with the present invention.

FIG. 1 shows, schematically, part of a matrix-array type liquid crystal cell 2 with a layer formed of a ferroelectric liquid crystal material, such as biphenyl ester sold under the trade name BDH SCE3, and having a thickness in the range of from 1.4 μm to 2.0 μm. The pixels 4 of the matrix are defined by areas of overlap between members of a first set of row electrodes 6 on one side of the liquid crystal layer and members of a second set of column electrodes 8 on the other side of the liquid crystal layer. For each pixel, the electric field thereacross determines the state and hence alignment of the liquid crystal molecules. Parallel polarizers (not shown) are provided at either side of the cell 2. The relative orientation of the polarizers determines whether or not light can pass through a pixel in a given state. Accordingly, for a given orientation of the polarizers, each pixel has a first and a second optically distinguishable state provided by the two bistable states of the liquid crystal molecules in that pixel.

Voltage waveforms are applied to the row electrodes 6 and column electrodes 8 respectively by row drivers 10 and column drivers 12. The matrix of pixels 4 is addressed on a line-by-line basis by applying voltage waveforms, termed strobe waveforms, serially to the row electrodes 6 while voltage waveforms, termed data waveforms, are applied in parallel to the column electrodes 8. The resultant waveform across a pixel defined by a row electrode and a column electrode is given by the potential difference between the waveform applied to that row electrode and the waveform applied to that column electrode.

Figure 2:
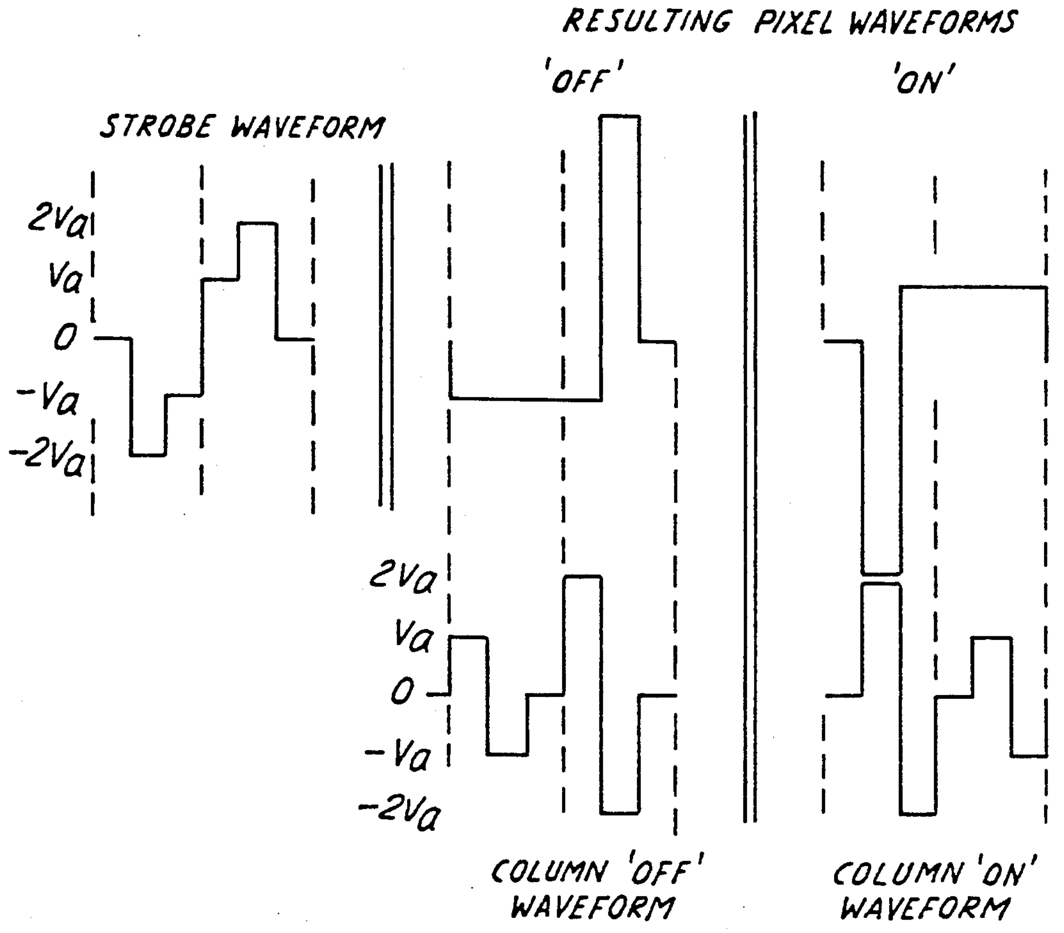
FIGS. 2 to 5 show waveform arrangement for switching pixels in the display device of FIG. 1.
Figure 3:
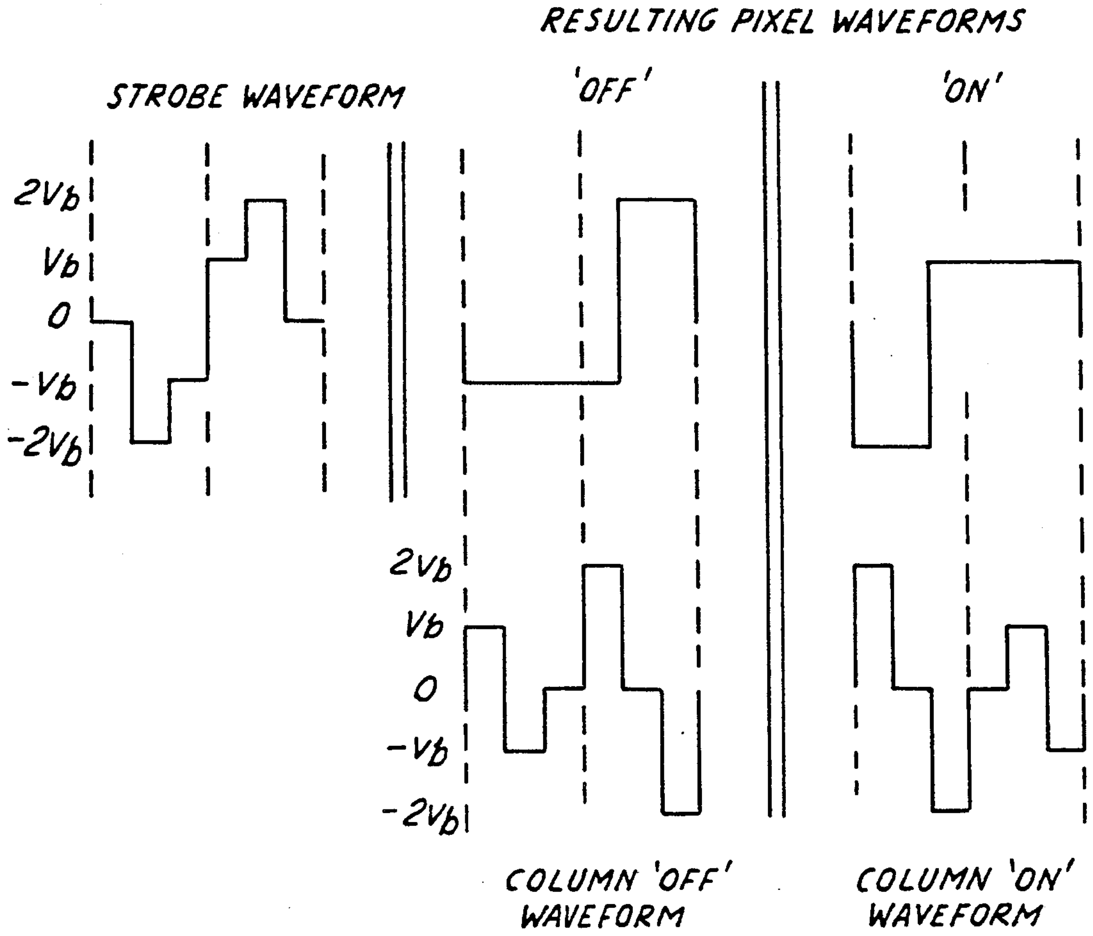
Figure 4:
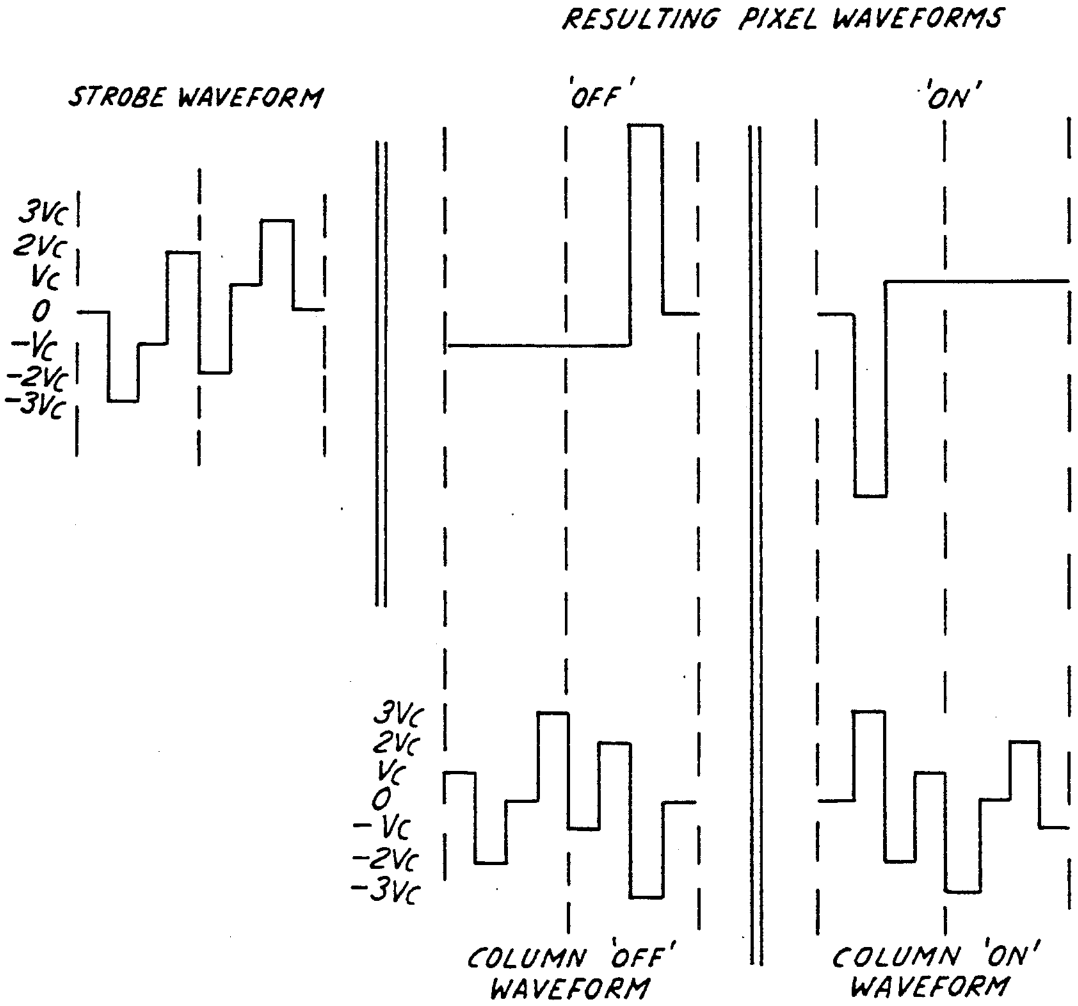

FIG. 2 shows an arrangement as disclosed in copending U.S. patent application Ser. No. 220,316 (Morris et al) also claiming priority from GB 8717172 and GB 8718351. The arrangement utilizes a 1.5 slot in the sense of a slot being the minimum time that the material takes to switch, i.e. $1.5t_s$. The driver output voltages have to change 6 times and 5 output states are required. The top left hand strobe waveform appears on the selected row. Unselected i.e., unstrobed rows have a constant 0 volts applied. The second row on the diagram shows the column or data waveforms. These have been arranged to consist of bipolar pulses to minimize their switching effect on unselected rows. The resultant pixel waveforms for a selected row are shown above the respective column waveforms. A pixel being switched off, receives a long low voltage negative pulse followed by a short high voltage positive one of equivalent area maintaining zero D.C. content. A pixel being switched on receives a short high voltage negative equalising pulse followed by a long low voltage positive switching pulse. Related schemes are shown in FIGS. 3 and 4 giving alternative equalisation pulse shapes.

Figure 5:
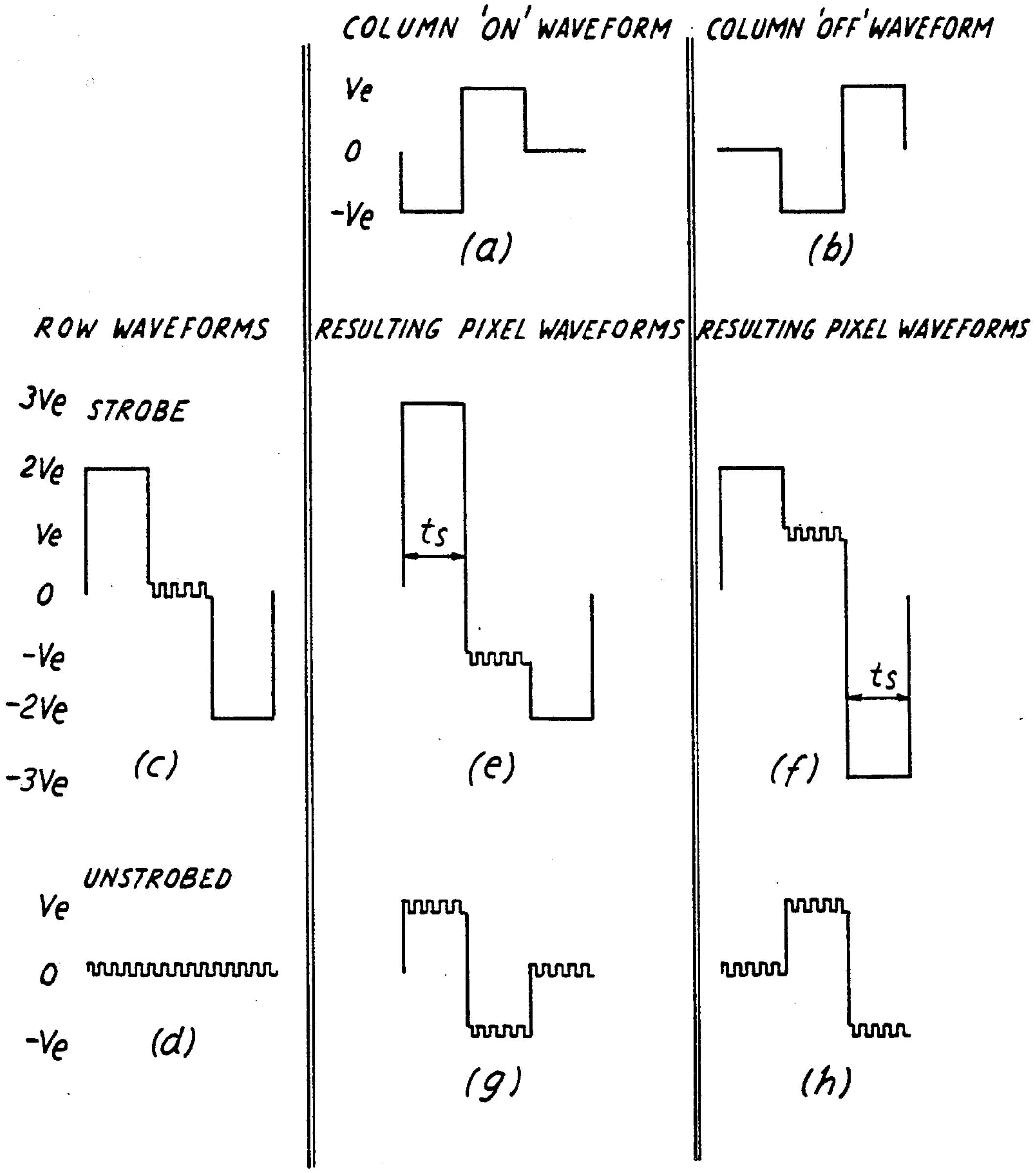

FIG. 5 shows a one field three slot scheme arrangement including high frequency A.C. stabilisation. A pixel is switched by a pulse of height $\pm 3\ V_e$ and width $t_s$. This switching pulse is charge balanced by two pulses of width $t_s$, a first pulse of height $\pm 2\ V_e$ and a second pulse of average height $\pm V_e$. These resulting pixel waveforms, as shown in FIGS. 5*e* and 5*f* are produced by the combination of a strobe waveform, as shown in FIG. 5*c* and one of the column waveforms, respectively as shown in FIGS. 5*a* and 5*b*. The resulting pixel waveforms on unstrobed rows are shown in FIGS. 5*g* and 5*h*, the pixels of the unstrobed rows being A.C. stabilised.

These relatively complex waveforms need not be generated independently at each row or column driver. In each case the row or column output stage need only switch between one of the two waveforms.

Figure 6:
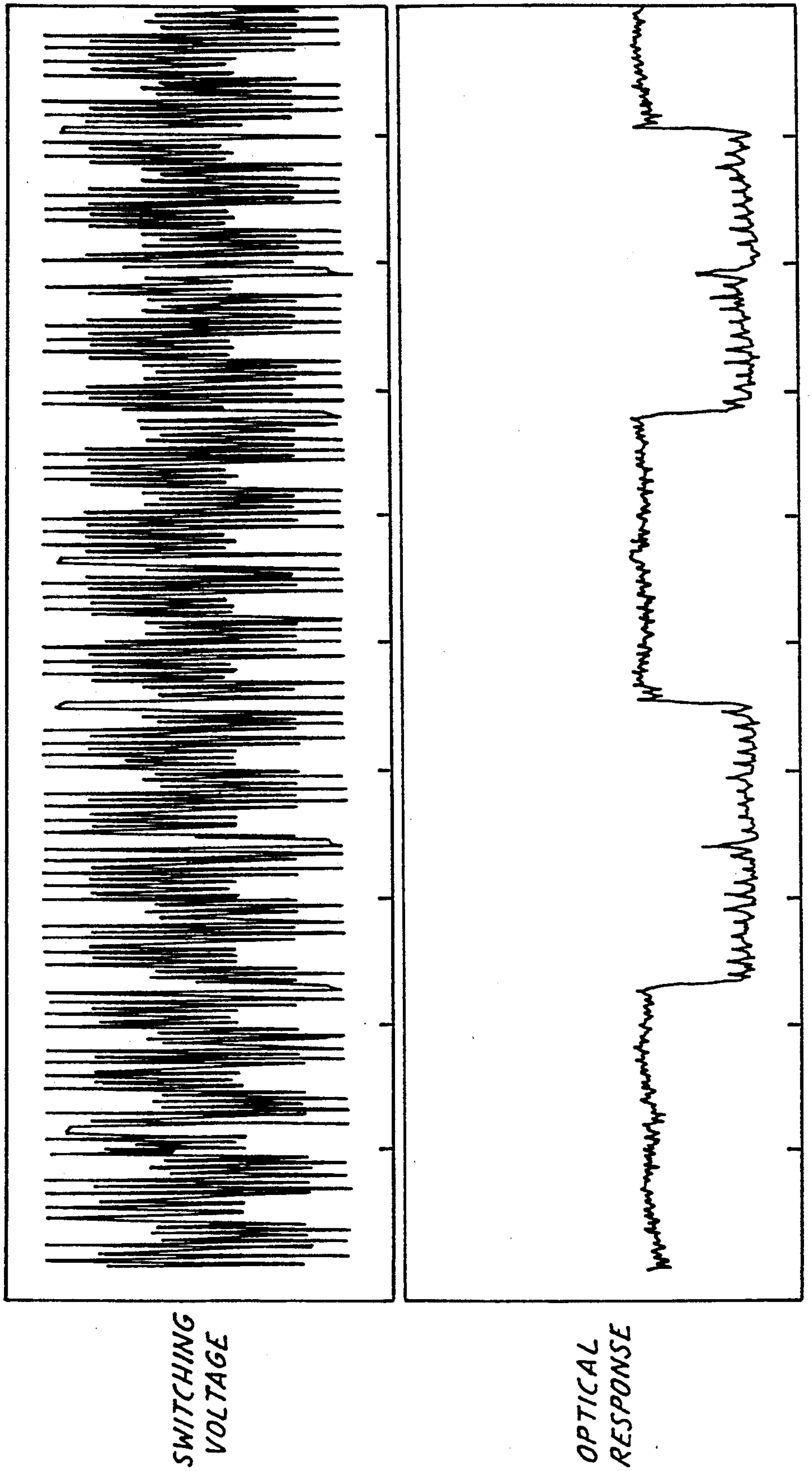
FIGS. 6 and 7 show, to different time scales, the switching voltage and resulting optical response of a pixel in the display device of FIG. 1.
Figure 7:
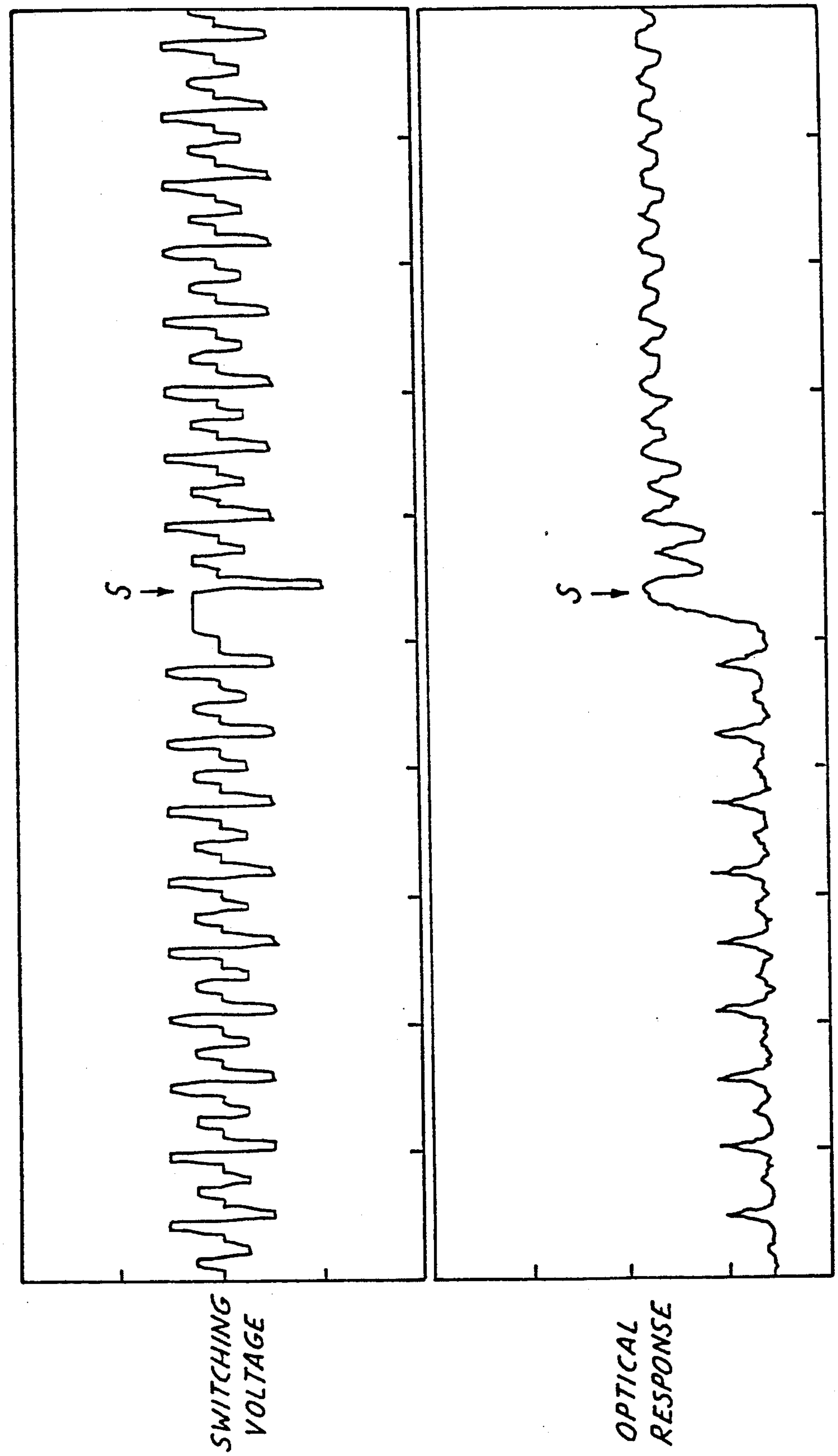

FIGS. 6 and 7 show an oscilloscope trace of the switching voltage, i.e. resulting pixel waveform, and optical response resulting from a simulation of a waveform arrangement similar to that of FIG. 2. FIG. 6 shows that the liquid crystal is switching between the two optically distinguishable states and remaining stable while the row is not being selected; the switching waveform is too fast for the oscilloscope sampling. FIG. 7 shows in more detail the switching point S. Switching occurs when the wide pulse is applied. The narrower equalisation and crosstalk pulses serve to stabilise the pixel state.

Figure 8:
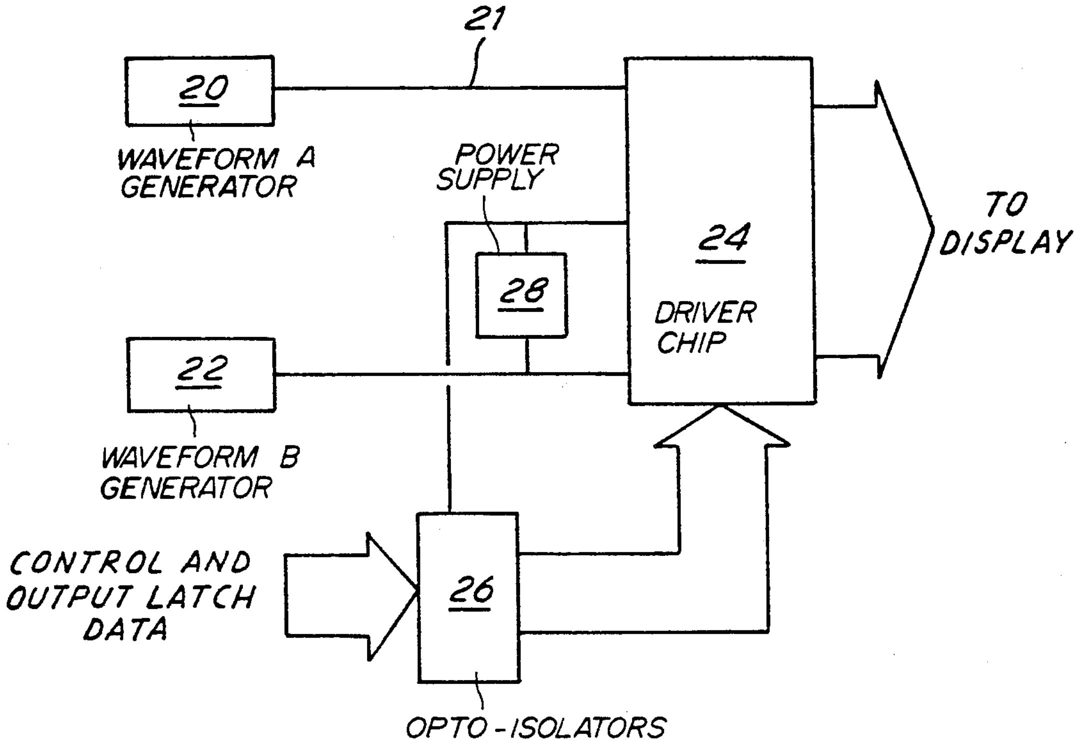
FIG. 8 shows schematically a drive circuit provided in accordance with the present invention.

FIG. 8 shows a block diagram representing a drive circuit provided in accordance with the present invention. The drive circuit comprises means 20 to generate a first waveform A at a first supply rail 21 and means 22 to generate a second waveform B at a second supply rail 23 which acts as ground potential for the circuit. A display driver chip 24 has a plurality of outputs, each including a switch for switching the output either to waveform A at the first supply rail 21 or to waveform B at the second supply rail 23. Accordingly a respective output waveform is produced at each of the plurality of outputs.

The selective switching of each output to either waveform A or to waveform B is controlled by control and output latch data from a control circuit (not shown). As the ground potential of the drive circuit as a whole is varying with the voltage of waveform B, the data is fed to the driver chip 24 via means to isolate the data waveforms so that these will be relative to the supply rail 23, such as opto-isolators 26. If the logic for an output is '1' then the output is switched to waveform A at supply rail 21; if the logic is '0' then the output is switched to waveform B at supply rail 23. The power supply to the driver chip 24 comprises an isolated power supply 28 to provide a constant 12 V potential difference with respect to the potential of the ground supply rail 23.

Figure 9:
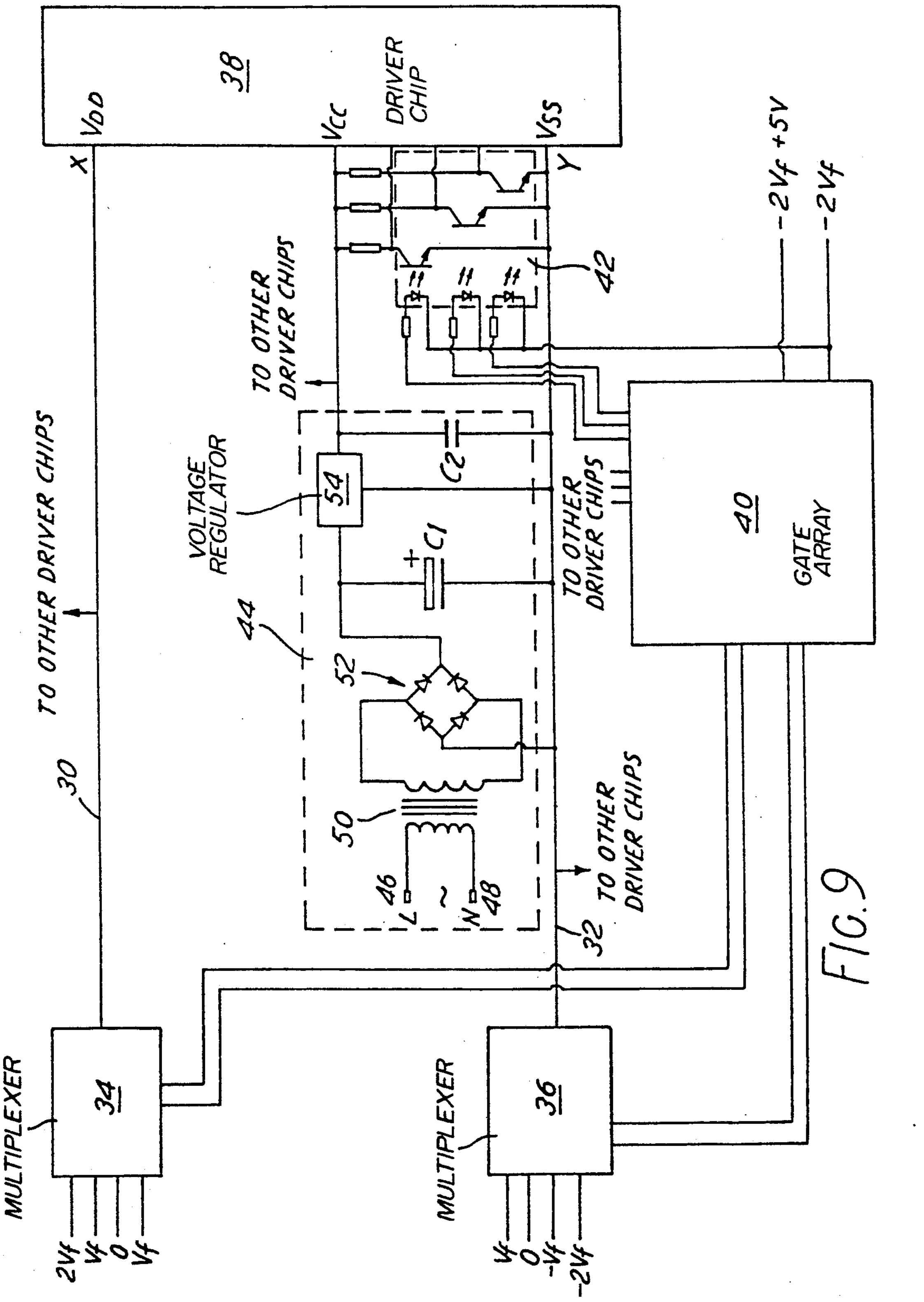
FIG. 9 shows a first embodiment of a drive circuit.

A first specific embodiment of a drive circuit is shown in FIG. 9. Waveforms X and Y at supply rails 30 and 32 are generated by first and second 4-way high voltage multiplexers 34, 36. Each multiplexer 34, 36 is capable of generating four voltage states, e.g. states 2 $V_f$, $V_f$, 0 and $-V_f$ for multiplexer 34 and states $V_f$, 0, $-V_f$ and $-2\ V_f$ for multiplexer 36, to produce the respective waveform, the voltage state generated at any particular instant being one of the four states and determined by logic inputs $S_1$, $S_2$ to multiplexer 34 and logic inputs $S_3$, $S_4$ to multiplexer 36, as shown below:

| Multiplexer 34 | | | Multiplexer 36 | | |
|---|---|---|---|---|---|
| $S_1$ | $S_2$ | Output (X) | $S_3$ | $S_4$ | Output (Y) |
| 0 | 0 | $-V_f$ | 0 | 0 | $-2V_f$ |
| 0 | 0 | 0 | 0 | 1 | $-V_f$ |
| 1 | 0 | $V_f$ | 1 | 0 | 0 |
| 1 | 1 | $2V_f$ | 1 | 1 | $V_f$ |

For the aforementioned biphenyl ester, $V_f=35$ V can be used.

The display driver chip 38 of the circuit is an Si 9555 (manufactured under the trade mark 'Siliconix') having 32 channels, i.e. a 32 bit stage shift register, 32 latches and 32 outputs. Each one of the outputs is switched to either the voltage of supply rail 30 (i.e. waveform X) by a logic input of '1' or to the voltage of supply rail 32 (i.e. waveform Y) by a logic input of '0'.

The logic to control the multiplexers 34, 36 and the driver chip 38 is generated and synchronised by a gate array 40. FIG. 9 shows three outputs from the gate array 40 connected to respective three inputs of the driver chip 38 via three opto-isolators (designated generally by the reference 42). The three inputs shown comprise a clock input and a data input which load logic serially into the 32 bit stage shift register, and a latch enable which, when high, shifts the contents of the 32 bit stage shift register into an output register, in known manner Power is supplied to the gate array 40 itself by two supply rails at $-2\ V_f$ and $-2\ V_f+5$ V.

The driver chip 38 is powered by a 12 V constant DC supply produced by an isolated power supply 44 connected across a positive power supply rail 45 and the ground supply rail 32. Inputs 46, 48 to the power supply 44 are connected to a 240 V AC mains supply. The voltage is transformed down at a transformer 50 and rectified at a full wave rectifier 52. The power supply 44 further comprises a 10,000 μF electrolytic capacitor $C_1$, a 7812 voltage regulator 54 and a 100 nF capacitor $C_2$. The 12 V constant DC supply produced is constant with respect to the ground supply rail 32 and accordingly the positive power supply rail 45 has superimposed thereon the voltage of waveform Y.

A typical display device has of the order of several hundred row and column electrodes and accordingly a large number of driver chips are required. However a single multiplexer 34, multiplexer 36, isolated power supply 44 and gate array 40 can be provided for a set of row or column electrodes and corresponding driver chips.

Accordingly, rather than being used as a two state driver the chip is effectively being used as a set of analogue switches. The latches and the shift register are powered separately to the high voltage output stage so their operation is not affected, provided the power is maintained with respect to the ground (waveform B). Any of the outputs can be switched to either waveform A or waveform B. The only limitation is that the instantaneous voltage of waveform A must never be less than that of waveform B by more than two diode forward voltage drops. If the two alternative row or column drive waveforms cross then the contents of the output latches can be inverted and the waveforms interchanged.

Figure 10:
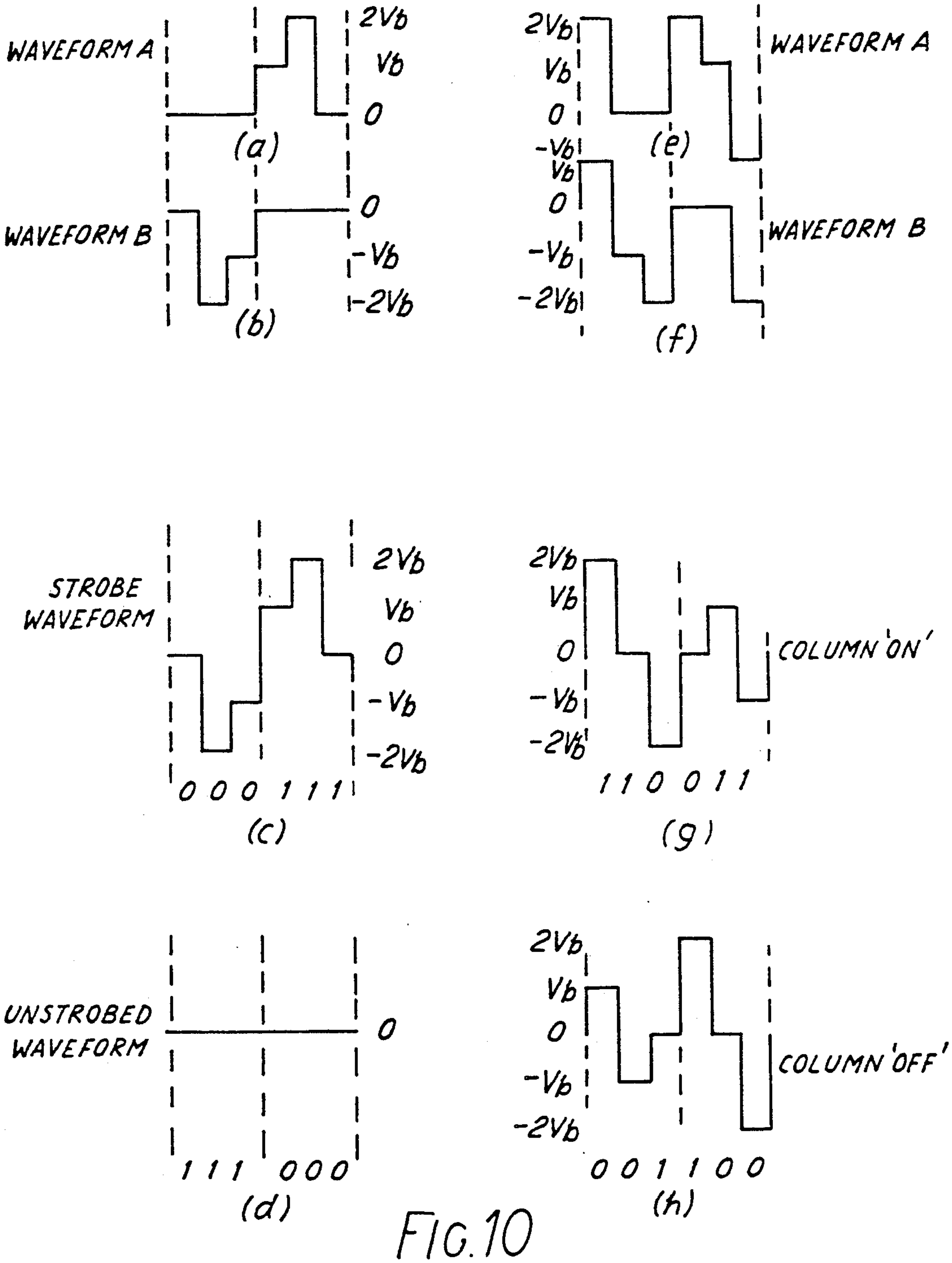
FIG. 10 shows waveforms used in a drive circuit to implement the waveform arrangement of FIG. 3.

FIG. 10 shows how this method and arrangement can be used to implement the arrangement of FIG. 3. The left hand column shows the waveforms for a drive circuit for the row electrodes and the right hand column shows the waveforms for a drive circuit for the column electrodes. FIGS. 10*a* and 10*b* show the waveforms A and B (both requiring three voltage states) applied to the supply rails of the row drive circuit. As can be seen, the strobed waveform (FIG. 10*c*) is produced by a data sequence of 000111 and the unstrobed waveform (FIG. 10*d*) by a data sequence of 111000. Accordingly the outputs of the row drive circuit are capable of producing respective output waveforms having five voltage states. FIGS. 10*e* and 10*f* show the waveforms A and B (both requiring three voltage states) applied to the supply rails of the column drive circuit. The column 'on' waveform (FIG. 10*g*) is produced by a data sequence of 110011 and the column 'off' waveform (FIG. 10*h*) by a data sequence of 001100. Accordingly the outputs of the column drive circuit are capable of producing respective output waveforms having five voltage states.

Similar waveforms A and B can be devised for the arrangements of FIGS. 2 and 4.

Figure 11:
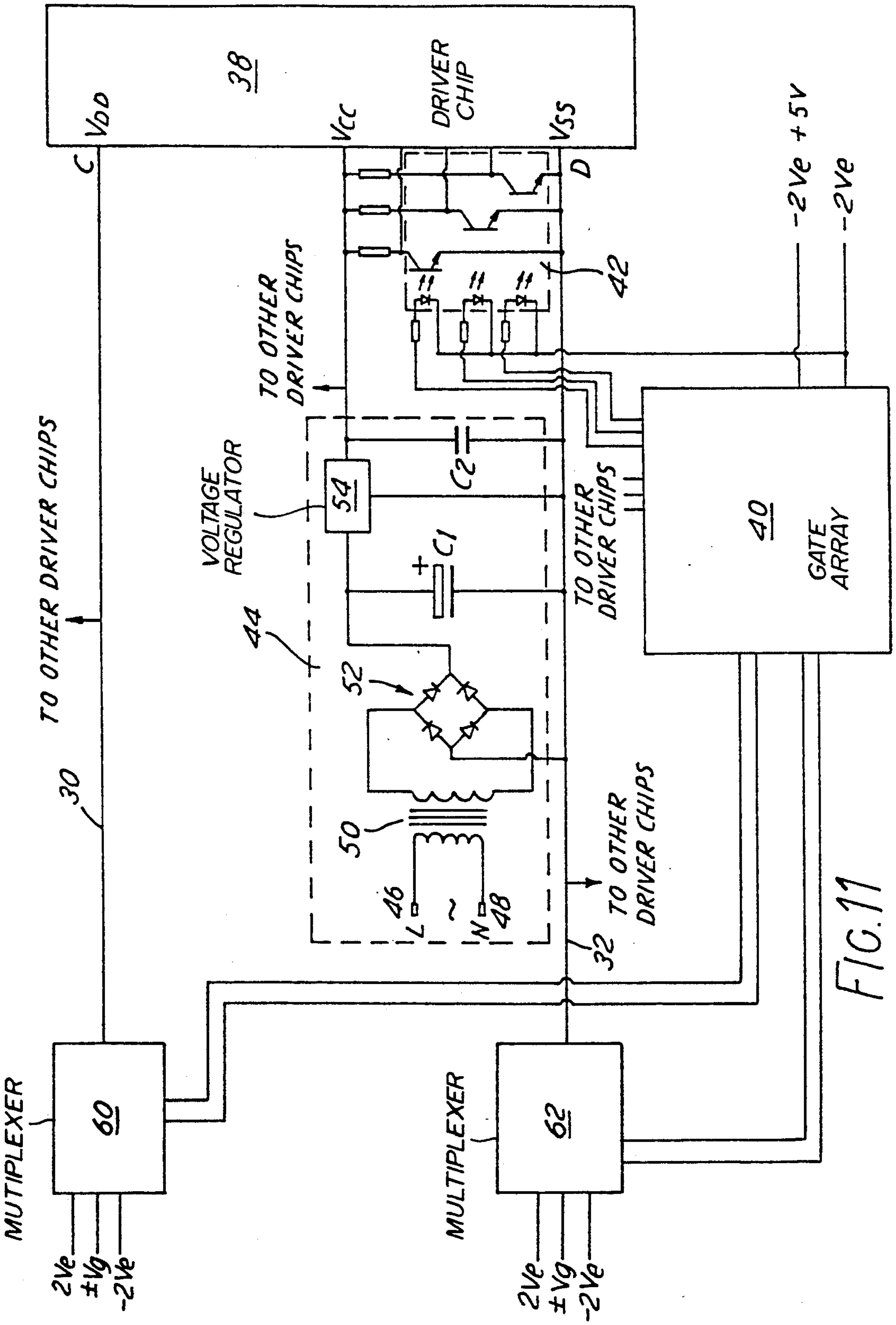
FIG. 11 shows a second embodiment of a drive circuit.

A second specific embodiment of a drive circuit is shown in FIG. 11. This drive circuit is similar to that of FIG. 9 and accordingly like parts are designated by like reference numerals.

Figure 12:
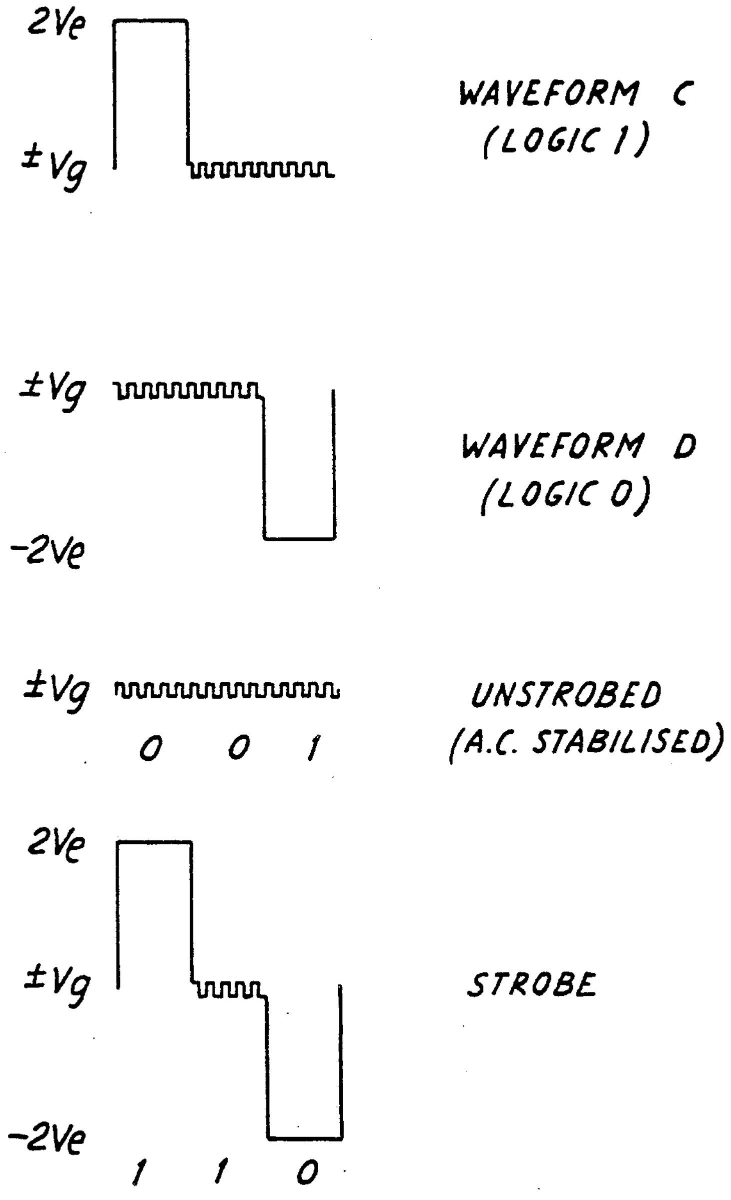
FIG. 12 shows waveforms used in the drive circuit of FIG. 11 to provide row waveforms as shown in FIG. 5.

Unlike the drive circuit of FIG. 9 which is to be used to produce row or column waveforms to implement the waveform arrangements of FIGS. 2 to 4, the drive circuit of FIG. 11 is being used to produce row waveforms to implement the A.C. stabilised one field three slot scheme of FIG. 5. Accordingly, each output of the drive circuit needs to be capable of generating $+2\ V_e$, $-2\,V_e$ and also the two $\pm V_g$ voltage states of the high frequency A.C. waveform of period $t_s/5$, a total of four voltage states in all. Typically, $t_s$ is in the range of from 10 μs to 100 μs and so the high frequency AC waveform has a frequency of in the range of about 50 KHz to about 500 KHz. For $V_e=45$ V, a value of $V_g=15$ V has been used. Accordingly, waveform generators 60, 62 produce waveforms C and D as shown in FIG. 12. As shown in FIG. 12, the waveforms are produced by selective switching, using a data sequence of 110 for the strobe waveform and data sequence of 001 for the A.C. stabilised waveform (for unstrobed rows).

Figure 13:
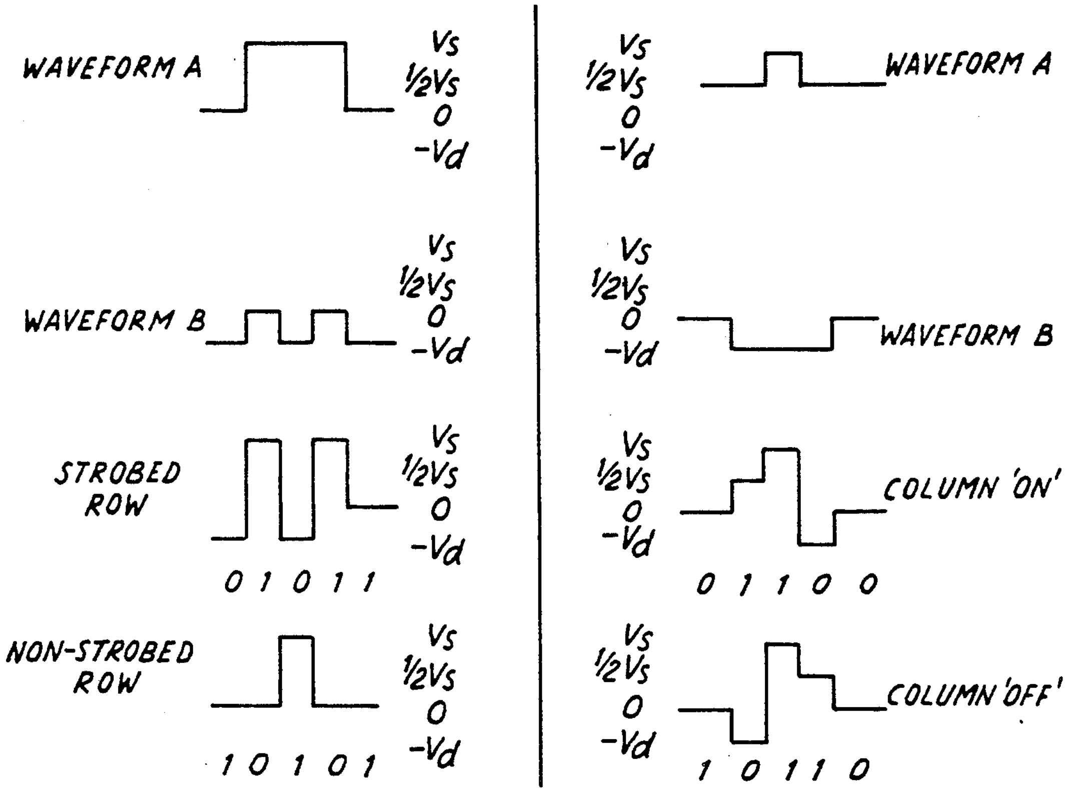
FIG. 13 shows waveforms used in a drive circuit to implement another waveform arrangement.

FIG. 13 shows an example of how this method and arrangement can be used to implement the five-slot coincident pulse scheme for a smectic C LC displays. The top four waveforms are those which would appear on the power lines to the respective driver chips. The lower four waveforms are those which appear on outputs that are cycled through the given data sequences.

I claim:

1. A drive circuit for producing a plurality of output waveforms for driving a matrix addressed display, the drive circuit comprising; a first signal generating circuit for providing a first waveform having at least two voltage levels, a second signal generating circuit for providing a second waveform having at least two voltage levels; a display driver arranged to receive the first and second waveforms and having a plurality of output terminals, each terminal arranged for outputting at least one of the first and second waveforms to the display; a control circuit for controlling the output of the display driver, thereby to effect a plurality of output waveforms from the display driver for driving the display such that at least one of the output waveforms has at least four different voltage levels.

2. A drive circuit according to claim 1 wherein the first and second waveforms each have three voltage levels and the first and second waveforms are arranged such that the instantaneous voltage of the first waveform is never less than the instantaneous voltage of the second waveform by more than a predefined amount whereby the driver circuit is caused to provide at least one output waveform having at least five different voltage levels.

3. A drive circuit according to claim 2 wherein at least one of the first and second waveforms includes a relatively high frequency component to comprise two of said at least two voltage levels of the at least one of the first and second waveforms.

4. A drive circuit according to claim 1 wherein at least one of the first and second waveforms includes a relatively high frequency component to comprise two of said at least two voltage levels of the at least one of the first and second waveforms.

5. A drive circuit according to claim 1 wherein the first and second signal generating circuits comprise first and second multiplexer circuits each having a plurality of inputs, the first and second multiplexer circuits each being arranged to receive a respective one of a plurality of voltage levels on each input, and wherein the control circuit is arranged to provide further control signals to the first and second multiplexer circuits, the first and second multiplexer circuits being arranged to provide, respectively, the first and second waveforms each having the at least two voltage levels from the plurality of voltage levels on the plurality of inputs in response to the further control signals received thereby.

6. A drive circuit according to claim 1 comprising a plurality of opto isolator circuits between the control circuit and the driver circuit for affording the control signals to the driver circuit.

7. A drive circuit according to claim 1 wherein the driver circuit comprises a plurality of shift register circuits and a respective plurality of latch circuits.

8. A drive circuit according to claim 1 wherein the control signals comprise binary coded control signals.

9. A display device comprising a matrix-array type liquid crystal cell including a liquid crystal layer, a first set of electrodes and a second set of electrodes, said first and second set of electrodes overlapping to provide areas of overlap for defining a plurality of pixels in the liquid crystal layer, the display device further comprising a first drive circuit for producing an output waveform for each of said first set of electrodes and a second drive circuit for producing an output waveform for each of said second set of electrodes wherein at least one of said first drive circuit and said second drive circuit comprises a first signal generating circuit for providing a first waveform having at least two voltage levels, a second signal generating circuit for providing a second waveform having at least two voltage levels, a display driver circuit arranged to receive the first and second waveforms, and having a plurality of output terminals adapted to receive either the first or second waveforms, and a control circuit for providing control signals for controlling the output of the driver circuit whereby the display driver circuit, in response to the control signals, provides to the electrodes coupled thereto, a plurality of waveforms for driving pixels of the display, at least one of the waveforms for driving pixels of the display having at least four different voltage levels.

10. A method of producing a plurality of output waveforms for driving a matrix addressed display, the method comprising generating simultaneously a first and second waveform, each one of said first and second waveforms having at least two voltage levels, affording the first waveform to a first voltage supply terminal of a display driver circuit, affording the second waveform to a second voltage supply terminal of the display driver circuit, whereby the first and second waveforms are caused to act, respectively, as first and second supply waveforms for the display driver circuit, generating a plurality of control signals, affording the control signals to control input terminals of the display driver circuit for controlling switching of the first and second voltage supply terminals of the display driver circuit to output terminals of the display driver circuit, thereby to enable the display driver circuit to provide a plurality of output waveforms for driving the display, in response to the control signals, at least one of the output waveforms having at least four different voltage levels.

* * * * *